US010664123B2

(12) United States Patent
Basir

(10) Patent No.: US 10,664,123 B2
(45) Date of Patent: *May 26, 2020

(54) SPACE AND TIME COGNITIVE MOBILITY SYSTEM WITH DISTRIBUTED AND COOPERATIVE INTELLIGENCE CAPABILITIES

(71) Applicant: Appy Risk Technologies Limited, Cheshire (GB)

(72) Inventor: Otman A. Basir, Waterloo (CA)

(73) Assignee: Appy Risk Technologies Limited, Cheshire (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/273,605

(22) Filed: Feb. 12, 2019

(65) Prior Publication Data

US 2019/0294302 A1 Sep. 26, 2019

Related U.S. Application Data

(63) Continuation of application No. 13/727,464, filed on Dec. 26, 2012, now Pat. No. 10,209,848.

(60) Provisional application No. 61/583,169, filed on Jan. 4, 2012, provisional application No. 61/580,077, filed on Dec. 23, 2011.

(51) Int. Cl.
*G06F 3/048* (2013.01)
*G06F 3/0481* (2013.01)

(52) U.S. Cl.
CPC .................. *G06F 3/0481* (2013.01)

(58) Field of Classification Search
CPC ....... G06F 3/0481; G06F 3/0482; G06F 3/048
See application file for complete search history.

(56) References Cited

U.S. PATENT DOCUMENTS

| 6,778,073 B2 * | 8/2004 | Lutter | H04R 5/04 340/10.1 |
| 6,845,451 B1 * | 1/2005 | Anand | G06F 21/31 709/223 |
| 2003/0100336 A1 * | 5/2003 | Cronin | H04M 1/7253 455/556.2 |

(Continued)

FOREIGN PATENT DOCUMENTS

WO 2011087204 A2 7/2011

*Primary Examiner* — Mahelet Shiberou
(74) *Attorney, Agent, or Firm* — Carlson, Gaskey & Olds, P.C.

(57) ABSTRACT

A system enables the user to customize the temporal and/or spatial behaviour aspects of desired things with respect to one or more target platforms. The desired things include objects, actions, and media files and can be associated with a time (T-thing), a location (L-thing), a time and location (LT-thing), a platform (P-thing), and combinations thereof. The user can pick and assemble multiple things into meta-things and create meta things of various types. The target platforms include any devices or systems that can be programmed to perform behaviors. The user programs a set of rules, which are then used to specify the behavioral aspects exercised by the system on the target platforms. The user interacts with the system through a portal and/or a mobile application. The portal is an intuitive GUI that enables the user to program the system in a simple pick-drag-and-drop fashion.

31 Claims, 4 Drawing Sheets

(56) References Cited

U.S. PATENT DOCUMENTS

| | | | |
|---|---|---|---|
| 2005/0273725 A1* | 12/2005 | Russon | G06F 16/58 715/780 |
| 2006/0224798 A1* | 10/2006 | Klein | G06F 16/68 710/62 |
| 2008/0046311 A1* | 2/2008 | Shahine | G06Q 10/109 705/14.57 |
| 2008/0109718 A1* | 5/2008 | Narayanaswami | G06Q 10/109 715/262 |
| 2009/0158186 A1* | 6/2009 | Bonev | G06Q 30/00 715/769 |
| 2009/0177745 A1* | 7/2009 | Davis | G06Q 10/107 709/204 |
| 2009/0276547 A1* | 11/2009 | Rosenblatt | G06F 3/017 710/33 |
| 2010/0131978 A1* | 5/2010 | Friedlander | H04L 12/2812 725/37 |
| 2012/0150971 A1* | 6/2012 | Bahrainwala | G06Q 10/107 709/206 |
| 2012/0158845 A1* | 6/2012 | Baalu | G06Q 30/02 709/204 |
| 2013/0040631 A1* | 2/2013 | Truskovsky | H04M 1/72577 455/420 |
| 2013/0136412 A1* | 5/2013 | Lee | H04M 3/4878 386/230 |
| 2013/0179272 A1* | 7/2013 | Bonev | G06Q 10/109 705/14.66 |
| 2014/0033047 A1* | 1/2014 | Poling | G06F 17/2205 715/730 |

* cited by examiner

SPACE AND TIME COGNITIVE MOBILITY SYSTEM WITH DISTRIBUTED AND COOPERATIVE INTELLIGENCE CAPABILITIES

CROSS-REFERENCED TO RELATED APPLICATION

This application is a continuation of U.S. application Ser. No. 13/727,464, filed Dec. 26, 2012, which claims priority to U.S. Provisional Application No. 61/583,169, filed Jan. 4, 2012 and U.S. Provisional Application No. 61/580,077, filed Dec. 23, 2011.

BACKGROUND

Human machine interaction systems minimize the barrier between the human's cognitive model of what they want to accomplish and the computer's understanding of the user's task. This is achieved through design and development of intuitive and optimal user interfaces given the constraints of the application at hand. Intelligent human machine interaction system further improve the user experience by deploying cognitive methods to better understand user's goal/intention and allow users to communicate complex concepts such as spatio-temporal behaviors to the machines. On the other hand, machine to machine communication methods allow devices that typically belong to diverse platforms and that are potentially physically remote to interact with each other and operate cooperatively if desired. Lastly, advanced data analysis methods can be used to process the data provided by the users and respond appropriately, in a reactive or proactive manner, according to the identified data characteristics such as type, modality, size, priority, etc.

SUMMARY

The disclosed system spans multiple key categories of innovation including intelligent human-machine interaction, machine to machine communication and advanced data analysis. By integrating the components from all of the three aforementioned categories, this system provides an intuitive graphical user interface where users can define/create temporal, spatial, or spatio-temporal concepts/behaviors and associate them with target platforms where they will be executed/applied. The concepts/behaviors may include a single thing or a collection of things (meta-thing) of various types. A thing may include, but is not limited to, an action (e.g. close garage door), a conceptual object (e.g. shopping list), or a digital object (e.g. a media file). The associations are easily made through a sequence of pick, drag and drop actions performed by the user(s).

The system may be comprised of a collection of software modules that enable the user to customize the temporal and/or spatial behaviour aspects of desired things with respect to one or more target platforms. The thing may be an object (e.g. a shopping list), an action (e.g. an alert), or media file (e.g. music). The behavioural aspects may be exercised by the system based on a set of rules programmed by the user. The target platforms are any device or system that can be programmed to perform behaviors including, but not restricted to, an in-car infotainment system, TV, smartphone, garage door opener, oven, microwave oven, coffee maker, etc. The collection of software modules are hosted in a cooperative manner on a backend infrastructure (cloud computing infrastructure) and/or mobile devices including the car as a mobile device.

The things can be created copied, grabbed from websites, or the internet in general, or a combination thereof. A portal may allow the user to interact with the system using an intuitive pick-drag-and-drop GUI. A mobile application may be provided to allow the user to interact with the system using multiple media including, but not restricted to, voice, display, gesture, olfactory, and tactile interfaces (touch, keyboard).

A things cache may be provided to allow the user to store and organize created things according to various criteria including, but not restricted to, priority, popularity, frequency, etc. For example the user can create a reminder and store it in the things-cache.

The system may implicitly create and update things in the things-cache based on the learned user behavior over time. The implicitly created things in the cache can be manually updated, assigned a common/friendly name, or overridden/removed from the things-cache. The implicitly created things-cache is used for recommendations for the user to review and include or reject.

The portal may provide a map tool, a calendar tool, and a scheduling tool. The portal and/or user interface can reside on a server, desktop, laptop, smartphone, or in-car-system. The portal may keep the platform(s) and associated systems aware of changes the user has introduced to the portal, e.g. new things added, new L-things created, new social media networks, etc.

The platforms may keep the portal informed about their location and the presence of the user over time. The platforms may use visual, auditory, gesture, tactile, and olfactory capabilities to interact with the user. The platforms may be automatically reconfigured to reflect changes made by the user to the platform.

The mobile application can determine if the user is present in the car. The user presence in the car may be determined using wireless identification between the application and the car (for example, by detecting a car Bluetooth or other wireless peripheral associated with the car). The platform may be reconfigured based on the identity of the user.

The application can be hosted and executed on platforms including, but not restricted to, a smartphone, a navigation system, dedicated hardware, or hardware installed in the vehicle. The application may be able to interface with the car to determine car related information including, but not restricted to, diagnostic codes, emission, speed, and acceleration.

The desired things may include a single thing or a collection of things (meta-thing) of various types. The things can be of various types including:
    a. Generic thing: any object, action, or concept
    b. T-thing: time driven things
    c. L-thing: location driven thing
    d. LT-thing: location and time driven thing
    e. Meta-thing: compound generic things
    f. Meta-L-thing: compound time driven things
    g. Meta-L-thing: compound location things
    h. Meta-LT-thing: compound location and time driven things
    i. P-thing: platform associated thing or things A location may be a geospatial location and/or a user defined zone including, but not restricted to, a landmark on the map (e.g. shopping mall), a road segment, a postal/zip area, an address, etc. An L-thing is created by the user performing the steps including:
    a. Picking a thing from the things cache; and b. Dragging and dropping it on a desired location on the map.

A meta-L-thing may be created by the user picking more than one L-thing and assembling them into a meta-L-thing.

A T-thing may be created by the user performing the steps including
 a. Picking a thing from the things cache; and
 b. Dragging and dropping it on a desired time of the calendar.

The T-things can be time constrained (or not) at the start and/or the end of the user defined behavior, i.e. the T-things can be
 a. Open-start/Open-End;
 b. Open-start/Constrained-end;
 c. Constrained-start/Open-end; or
 d. Constrained-start/Constrained-end.

The desired time of a T-thing can be of absolute (e.g. specific date/time), relative (e.g. a week from now) or periodic (e.g. every month) type.

A meta-T-thing may be created by the user picking more than one T-thing and assembling them into a meta-T-thing.

An LT-thing may be created by the user performing either one of the steps including
 a. Picking a L-thing and drag and drop it on a desired time of the calendar; and
 b. Picking a T-thing and drag and drop it on a desired location on the map.

A meta-LT-thing is created by the user picking more than one LT-thing and assembling them into a meta-LT-thing.

A P-thing is created by the user performing the steps including:
 a. Picking a thing, L-thing, T-thing, LT-thing, or any of their meta versions; and
 b. Dragging and dropping it on a desired target platform or platforms.

The platforms of a P-Thing can be treated by the user as operands of logical operations. For example, a P-Thing that was created by associating a Thing to "my Ford" car can be OR'ed with a "my smartphone." In this case this P-thing is associated to either my car or my smartphone, but each platform is associated with it independently. However, if the two were AND'ed, then the association will be joint, and as such the phone has to be in this specific car for the association to be fulfilled.

The deployment of a P-thing may depend on the nature of the thing, as defined by the user rules. For example, if the P-thing is a song associated with a car, then the song will be transferred to the car to be played in the car. If the P-thing is an alert associated to e car, then it will be transferred and executed as soon as the user gets into the car.

The rule set governing the behavioral aspects may include:
 a. L-things and their meta versions are executed once the location event is satisfied;
 b. T-things and their meta versions are executed as soon as the time event is satisfied;
 c. LT-things and their meta versions are executed once both the location and time events are satisfied; and
 d. P-things that have no location or time association are executed implicitly as soon as the desired platform is fulfilled.

The user can import the target platforms belonging to other users into his/her portal conditioned upon their permission being granted. For example in a social network platforms of other people in a user's social network are available as platforms to the user, according to limits that might be set by each user. For example, a user can attach a song to another user's phone on that user's birthday.

The user can grant access to other users to customize the temporal and/or spatial behaviour aspects of desired things with respect to one or more of his/her target platforms.

Each platform may contain user information that accumulates over time including, but not restricted to, configuration parameters, navigation destinations, points of interest, infotainment files, contacts, calendars, emails, text messages, phone activities, etc. An agent may be employed to keep track of the user information on all platforms and ensure that a copy of this content is archived on the portal. Should the user lose or break the platform, the content will be reinstated to the new platform the user introduces to the portal.

A translation engine may be employed to ensure that reinstating user information on a replacement or new platform introduced by the user is possible by the platform-agnostic nature of the system. For example, the user can choose to replace his Blackberry with an iPhone or vice versa. The content of one will seamlessly be reinstated into the other.

The car and user-related information may include, but is not restricted to, presence of the user in the car, location of the car (or smartphone), battery level, fuel level, diagnostic codes, speed, acceleration, $CO_2$ emissions, etc.

DETAILED DESCRIPTION

Figure 1:
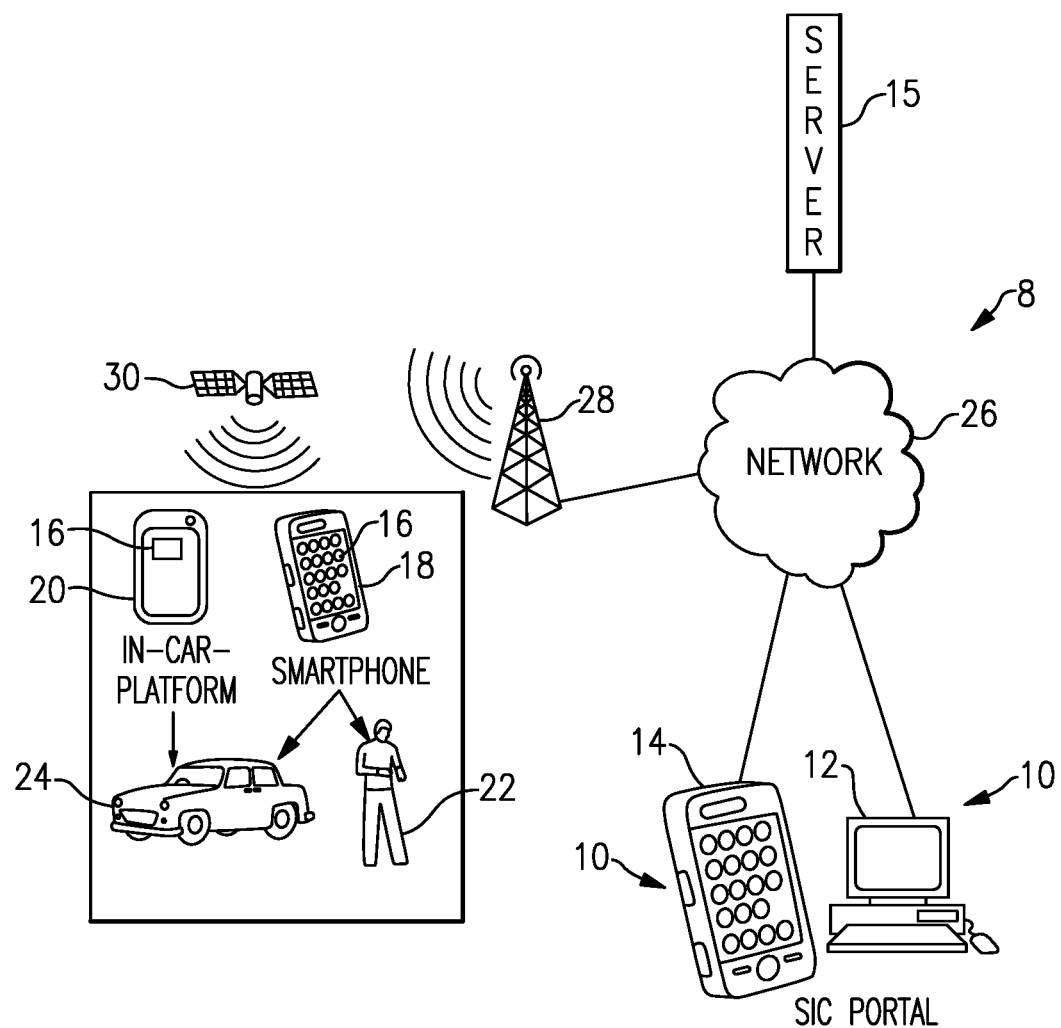
FIG. 1 is a schematic representing an embodiment of the present invention including the system portal, the mobile application, the backend infrastructure, the user, and a car as target platform.

Referring to FIG. 1, a mobility system 8 according to one embodiment of the present invention includes a portal software 10 hosted on a personal computer 12, a mobile device 14, or any backend infrastructure. The portal 10 may be provided by server 15 and communicates information to one or more mobile applications 16 running on mobile platforms such as smartphones 18 or on a vehicle-installed computer 20 through a communication network 26, which may include a plurality of components including radio masts 28 and satellites 30. The user 22 can interact with the system 8 using an intuitive GUI running on the mobile application 16 or the portal 10.

The smartphone 18, vehicle-installed computer 20 and personal computer 12 each have at least one processor, electronic storage, touchscreen or other interface (such as voice), and are suitably programmed to perform the functions described herein. The server 15 also includes at least one processor, storage, etc and is suitably programmed to perform the functions described herein. Of course, the server 15 could include more than one physical server and/or virtual servers implemented on such hardware. The server 15 provides the portal 10 to the mobile application 16 and the personal computer 12.

"Desired things" are all possible entities of interest to the user including objects, actions, and/or media files. The user can program the system 8 to customize the temporal and/or spatial behaviour aspects of desired things with respect to one or more target platforms such as a car 24.

The portal 10 allows the user to program the system using an intuitive GUI by associating desired things with specific time(s) and/or location(s) that define the spatial and/or temporal aspects of the expected behavior. The associations can be easily made through a pick-drag-and-drop procedure. The user can further customize the behavior by selecting the target platforms to exercise the behavior. The behavior itself is also defined by the user as a rule set. The user can use portal 10 to create tasks, alerts, organize media files such as music, movies, books, itineraries, social communities, calendar events, internet radio stations. The portal 10 can provide several tools including a map tool, a calendar tool, and a scheduling tool.

The mobile application 16 allows the user 22 to interact with the system using a variety of means mainly including voice, and if required, keyboard and screen. This application 16 also can interface with the car 24 to determine the car related information (e.g. diagnostic, emission, speed, acceleration). It can also determine if the user is present in the car 24 using wireless identification between the application 16 and the car 24 (for example, by detecting a car Bluetooth or other wireless peripheral associated with the car 24). The mobile application 16 can be hosted and executed on the smartphone 18 or on hardware installed in the vehicle 24, such as a navigation system or dedicated hardware.

Figure 2:
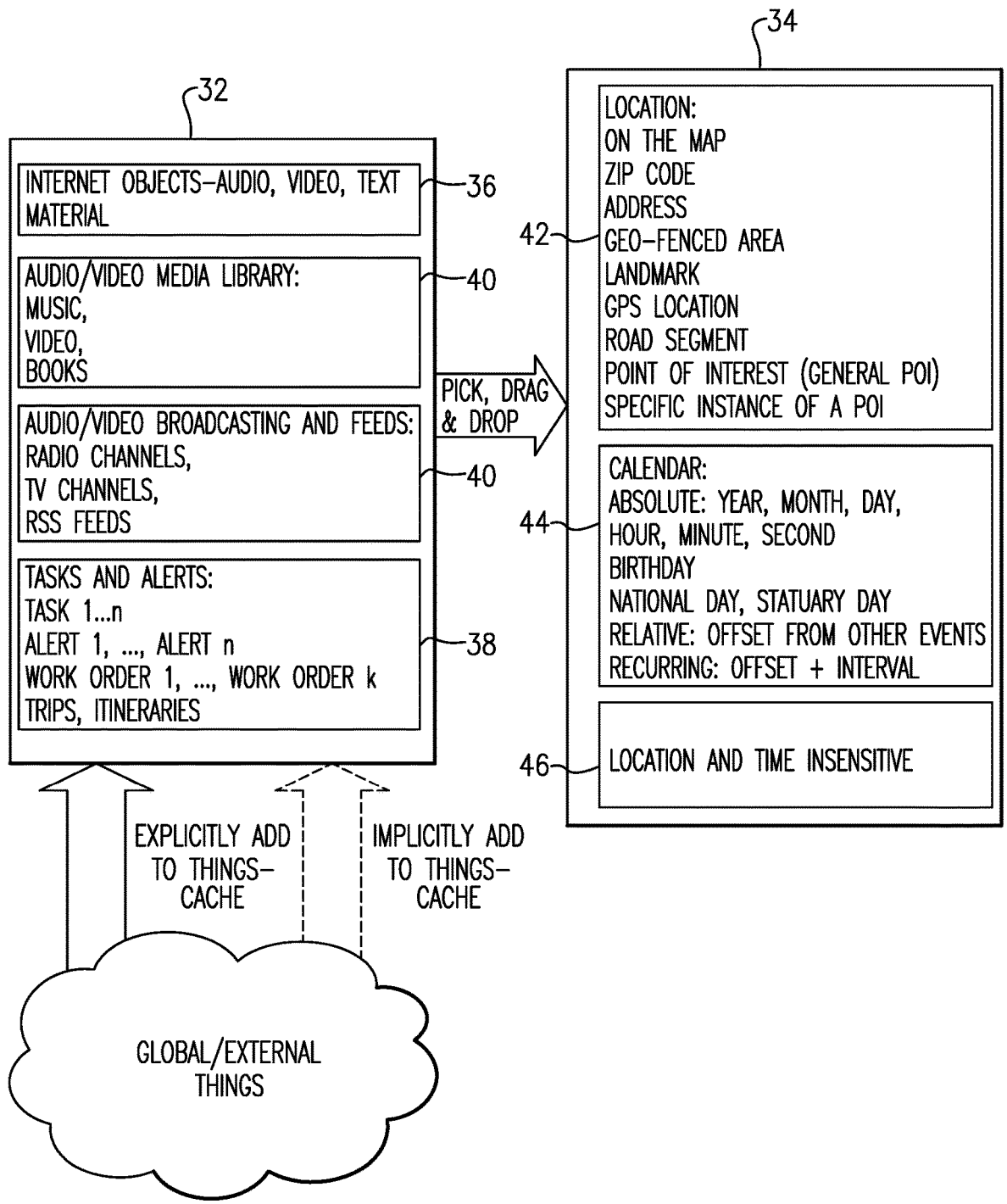
FIG. 2 is a schematic of a sample user interface including various types of things and several possible times/locations, which can be used to program the system.

The target platforms such as a car 24 are created and selected by the user 22 to define target destinations for deploying and or executing tasks. For instance, the user can define his/her cars, his/her smartphone, or home appliance as a target destination, The user 22 programs the system using an intuitive GUI by associating desired things with specific time(s) and/or location(s) that define the spatial and/or temporal aspects of the expected behavior. The associations are easily made through a pick-drag-and-drop procedure. The user 22 can further customize the behavior by selecting the target platforms to exercise the behavior. The behavior itself is also defined by the user as a rule set. FIG. 2 shows a schematic of a sample user interface where things in the things cache 32 can be picked, dragged, and dropped onto possible targets 34. The things cache 32 includes objects retrieved from the Internet 36, actions 38, or media files 40. The targets 34 include locations 42, times 44, and execution target platforms 46. The things cache 32 is a subset of things that are frequently accessed or recently accessed or which the system anticipates might be accessed soon (implicitly-created things, described further below).

The things in the things cache 32 can be objects 36 created copied, grabbed from websites, or the Internet in general, or a combination of (global/external things). An action 38 can be an alert, any phone action (e.g. call), sending/receiving SMS, Email, playing a media file, opening a garage door, etc. The media files 40 can be music, video, books, TV and radio channels, RSS feeds, etc.

The user can create things and store them in things-cache 32. For example the user can create a reminder and store it in the things cache 32. The things-cache 32 can be organized by the user based on priorities, categories, etc. Tasks and alerts 38 can be created using online forms, or dragging from other interfaces appropriate to the task. Some form entry/ data entry is required for certain activities—i.e. selecting alert style.

Depending on the target(s) associated with a thing being of spatial, temporal, and spatio-temporal nature, the user creates L-things, T-things, and LT-things, respectively. The user can selected multiple things and assemble them into a meta-thing. The meta-things can similarly be associated with target(s) of spatial, temporal, and spatio-temporal nature to meta-L-things, meta-T-things, and meta-LT-things, respectively.

The user can pick a thing from the things-cache 32, drag it, and drop it on a point on the map. The user can choose the point to be a landmark on the map, a road segment, a zone (e.g. postal or zip area), an address, a specific GPS location, or a user defined zone. The user can define this zone by drawing a geometrical area on the map of any shape. The user can give the user defined areas names (e.g, my home area, my work area, my preferred shopping area). For example the user can pick a song from the things-cache and drop on a map location, e.g. a road segment. This L-thing is now associated with this road segment. As another example, the user can create a list of articles he or she wants to buy as an L-thing by dragging the list of items to a mall. This list is then associated as an L-thing with that mall as the target. The system can intelligently make an association between this L-thing with other places that are of Mall type.

With L-things the user can configure the start of a task execution based on a geographical location. The user can create trips (in terms of destination points) in the things-cache 32. The user can drag a trip to a location on the map. This makes the trip to be associated with that location. Hence, a routing to that destination will be computed from the location associated with that trip. For example, the user who happens to be living and driving in Toronto, can pick a destination in Montreal as an L-thing, drag and drop it to a place in Montreal (e.g. the airport). Once the user happens to be in Montreal in the vicinity of the place associated with the trip, a route to the destination is computed based on traffic conditions. Current navigation systems cannot perform this type of task as they are designed to be simply implicit on the start of a trip to be the current location of the vehicle 24.

The user can pick a thing from the things-cache 32, drag, and then drop it onto a calendar. T-things can be dropped onto a year, onto a month of the year, onto a week of the year, day of the year, or a specific time of a day of the year. In case of periodic tasks, the user can also choose the frequency, e.g. every year, every month, every week, every day, or every specific time of the day. For instance, the user can choose the task of "call my parents" from the things-cache, drag it, and drop it onto a week. Now "call my parents" becomes a T-thing. Depending on which calendar level (year, month, day, time) the user chooses, the system will schedule the T-thing for execution accordingly (also based upon existing events in the user's schedule already).

For T-things at the year level, the system will provide the most flexibility. For T-things at the time level, the system 8 will provide the least flexibility. For instance, the user 22 can define a trip to a certain destination as a Thing. Then the user 22 can drag it to the calendar, say, to the month level. Depending on the length of the trip, the system will find an interval in the chosen month to schedule that trip for execution. However, if the trip was dragged to a day, then a time in the day will be determined to execute the trip. Accordingly, the T-things can be constrained-start/constrained-end, open-start/constrained-end, constrained-start/open-end, and open-start/open-end. The system 10 schedules with the intelligence of location awareness, for example, adding sufficient time buffer between meetings to travel from the location of one meeting to the location of the other meeting.

Things can also be associated with various target execution platforms by the user to create P-things. In this case the system will ensure that the P-thing is deployed to chosen target platform properly. The deployment will depend on the nature of the thing. For example, if the thing is a song, then the song will be transferred to the car for in use in the car. If it is an alert, then it will be transferred and executed as soon as the user gets into the car.

The platforms and a P-Thing can be treated by the user as the operands of logical operations. For instance, a P-Thing that was created by associating a thing to "my Ford" car can be OR'ed with a "my smartphone." In this case this P-thing is associated to either my car or my smartphone, but each platform is associated with it independently. On the other hand, if the two target platforms were AND'ed, then the association will be joint, and as such the phone has to be in this specific car for the association to be fulfilled. Boolean constraints can be added by first dragging a Thing to "my Ford", then selecting the start point of the link and dragging it to "my smartphone"—creating two links (depending on the interface, a modifier key like shift or control might be required to differentiate between adding a link and moving a link). The AND/OR can be specified as a dropdown at the intersection of the two links.

If one of the target platforms fulfills the association, the other platform disengages from the association. In the abovementioned example, as soon as "my Ford" fulfills the P-thing, the smartphone becomes irrelevant to that P-thing. The Not operator will ensure that P-thing is never fulfilled by the operand Not (P-thing). This will ensure that the specific thing will never be fulfilled by the P platform.

When creating a P-thing, it can be established whether the behavior is exercised only once or whether it is performed every time the conditions are satisfied.

The portal 10 keeps all of the target platforms informed of changes made by the user to the server 15, e.g. new L-things or T-things added. Furthermore, each of the platforms keeps the server 15 informed of it whereabouts, i.e. GPS location, and whether the user 22 is present or not.

The user 22 can add platforms of other people to his/her portal. This will allow the user to export his/her things, T-things, L-things, and LT-things to these platforms. For instance, the user can add his wife's smartphone (or in-car infotainment system) to his social netforms. He then can pick a thing such as a song from the Internet, drag the thing to her birthday on his calendar to create a T-thing, and then drop this T-thing onto his wife's platform. The wife's smartphone will now execute the T-thing based on file type implication on her birthday. Based on the context of the date and the type of the T-thing, the target platform will decide as to when on that day the T-thing should be executed.

The user can give access to others to create things, L-things, T-things, P-things, etc., and drop them onto one of the user's target platforms. For instance, in a social network environment platforms of the user are available to his/her friends according to the limitations that may be set by the user. A user's friend can then attach a song to the user's phone to be played on his/her birthday.

Each target platform contains user information that accumulate over time, e.g. configuration parameters, navigation destinations, points of interest, infotainment files, contacts, calendars, emails, text messages, phone activities, etc. The server 15 employs an agent that keeps track of such content on the platform and ensures that a copy of this content is archived on the portal. Should the user lose or break the platform, the content will be reinstated to the new platform the user introduces to the portal.

The user can use the platform content archive feature of the portal to ensure that platform content is synchronized among multiple platforms. In this case, for example, the user will have identical platform experience in two cars, or two smartphone.

The portal uses a translation engine to ensure that reinstating the platform contents is platform-agnostic. For example, in case the user can choose to replace his blackberry with an iPhone or vice versa the content of one phone will seamlessly be reinstated into the other.

Things may be implicitly created and updated by the system 10 to the things-cache 32 based on the learned user behavior over time. Once in the things cache 32, the implicitly created things can be manually updated, assigned a common/friendly name, or overridden/removed from the things cache 32. The implicitly created things in the things cache 32 can be used for recommendations to the user to review and to include or to reject. In one example of an implicitly created thing, the user receives a request from a contact to listen to a particular song. The system recognizes the contact as a friend, and based on the user having explicitly added previous suggestions from the contact to the things-cache 32, the system 10 may proactively add the suggested song to the things-cache 32 to save the user time.

As another example, the user may be reading a series of books by a particular author who author recently published a new book. The system 10 may proactively add this newly published book to the user's things-cache 32 in anticipation of the user finishing the current book and being interested in reading more from the same author.

Figure 3:
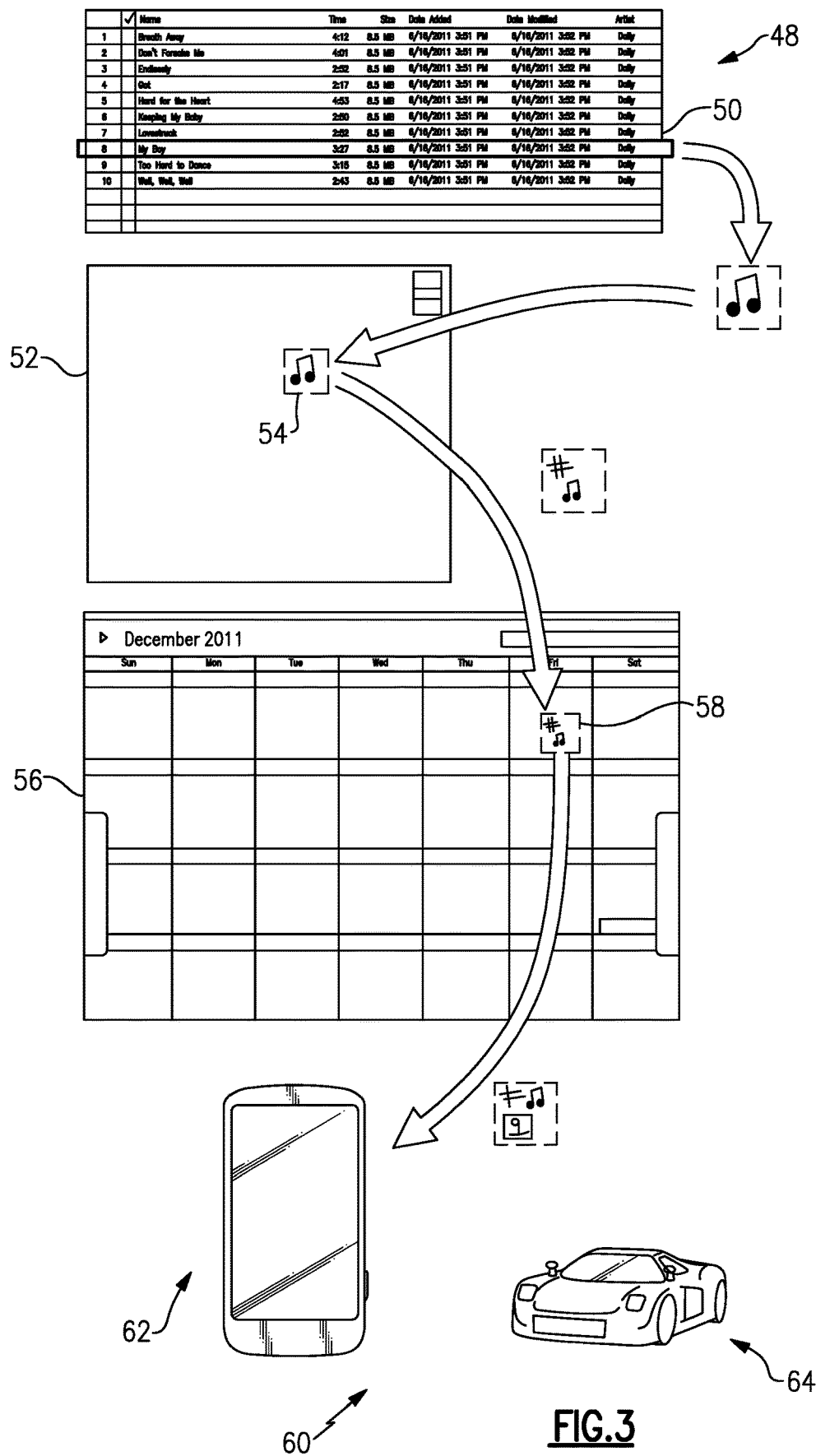
FIG. 3 is an example of programming the system to play a media file at a specific time and location on a target smartphone and/or a car.

FIG. 3 shows a specific example of programming the system with a media library 48 by selecting a music file 50, first dragging and dropping it onto a specific location 54 on a map 52 to create an L-thing, then dragging and dropping it onto a specific time 58 of a calendar 56 to create an LT-thing, and finally dragging and dropping it onto target platform 60 such a smartphone 62 or a car 64 to create a P-thing.

Figure 4:
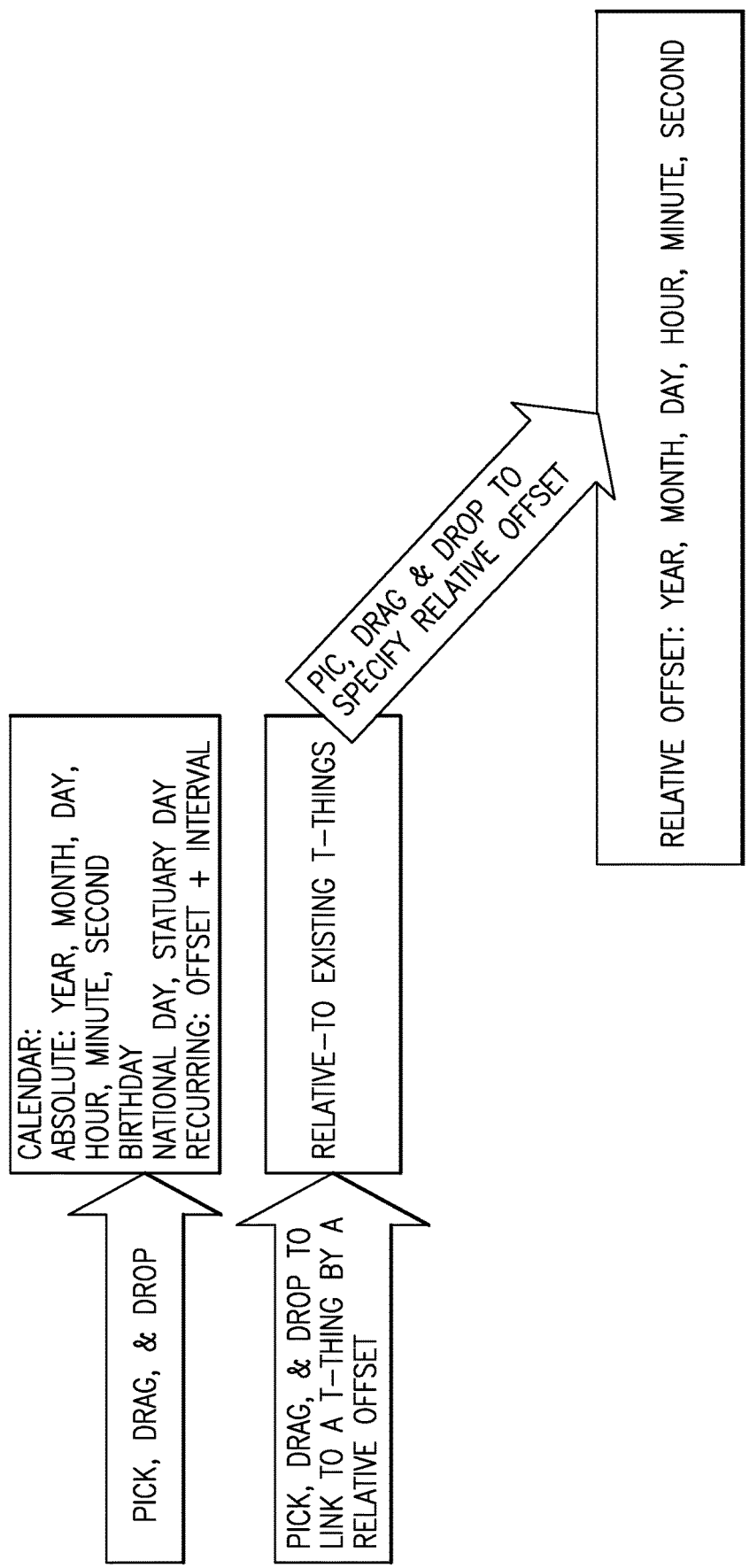
FIG. 4 shows an example interface for creating a relative time-dependent thing.

As shown in FIG. 4, the system 10 can provide an interface where the user can create a T-thing where the desired time is absolute (e.g. specific date/time), relative (e.g. a week from now) or periodic (e.g. every month) type.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers on method claim steps are for ease of reference in dependent claims and do not signify a required sequence unless otherwise specified.

What is claimed is:

1. A computer system including a processor wherein the computer system provides a drag-and-drop graphical user interface that enables a user to customize temporal and spatial behavior aspects of a plurality of desired things with respect to at least one target platform, wherein the desired things include objects, actions and media files, wherein the actions are actions to be performed by the computer system, and wherein the at least one target platform includes a smartphone or a vehicle, wherein the temporal behavior aspects of each of the plurality of desired things includes date or time at which the desired thing will be caused to be executed or applied, and wherein the spatial behavior aspects of each of the plurality of desired things includes a location at which the desired thing will be caused to be executed or applied.

2. The system of claim 1 wherein the behavioral aspects are performed by the system based on a set of rules defined by the user.

3. The system of claim 1 wherein the graphical user interface includes a things-cache that allows the user to store the plurality of desired things, wherein the desired things can be selected and drag-and-dropped within the graphical user interface.

4. The system of claim 3 wherein desired things are added to the things-cache automatically based on user behavior over time.

5. The system of claim 4 wherein desired things in the things-cache are automatically updated based on user behavior over time.

6. The system of claim 5 where the desired things automatically added to the things cache can be manually modified by the user.

7. The system of claim 1 further including a portal that provides the drag-and-drop graphical user interface, wherein the portal provides a map tool in which the user can drag-and-drop one of the plurality of things onto a map and thereby associate a location with the one of the plurality of things, and a calendar tool in which a user can drag-and-drop the one of the plurality of things onto a calendar and thereby associate a date with the one of the plurality of things and a scheduling tool.

8. The system of claim 1 further including a portal that provides the drag-and-drop graphical user interface, wherein the portal automatically informs a plurality of platforms of changes that the user has made to the things cache.

9. The system of claim 1 wherein the one or more platforms inform the system about the locations of the platforms and the presence of the user over time.

10. The system of claim 9 wherein the at least one target platform is a vehicle and wherein the system determines if the user is present in the vehicle.

11. The system of claim 10 wherein user presence in the vehicle is determined using wireless identification with the vehicle.

12. The system of claim 11 wherein at least one of the platforms is reconfigured based on the identity of the user.

13. The system of claim 1 wherein the desired things may include a single thing or a collection of things (meta-thing) of various types.

14. The system of claim 1 wherein the desired things are capable of being of various types including:
   a. Generic thing: any object, action, or concept;
   b. T-thing: time driven things executed based upon a time event being satisfied;
   c. L-thing: location driven thing executed based upon a location event being satisfied;
   d. LT-thing: location and time driven thing executed based upon the time event and the location event both being satisfied;
   e. Meta-thing: compound generic things;
   f. Meta-L-thing: compound time driven things;
   g. Meta-L-thing: compound location things;
   h. Meta-LT-thing: compound location and time driven things; and
   i. P-thing: platform associated thing or things executed based upon a desired platform being fulfilled.

15. The system of claim 14 wherein a location is a user-defined zone including a landmark on a map.

16. The system of claim 14 further including a portal that provides drag-and-drop graphical user interface, wherein the graphical user interface includes a things-cache that allows the user to store the plurality of desired things, wherein the desired things can be selected and drag-and-dropped within the graphical user interface, wherein a L-thing is created by the user performing the steps including:
   a. Picking a thing from the things cache; and
   b. Dragging and dropping the thing on a desired location on a map.

17. The system of claim 16 wherein the meta-L-thing is created by the user picking more than one L-thing and assembling them into a meta-L-thing.

18. The system of claim 16 wherein the T-thing is created by the user performing the steps including:
   a. Picking a thing from the things cache; and
   b. Dragging and dropping the thing on a desired time of a calendar.

19. The system of claim 16 wherein the desired time of a T-thing can be of absolute, relative or periodic type.

20. The system of claim 16 wherein a meta-T-thing is created by the user picking more than one T-thing and assembling them into a meta-T-thing.

21. The system of claim 16 wherein the LT-thing is created by the user performing either one of the steps of:
   a. Picking a L-thing and drag and drop the L-thing on a desired time of a calendar; or
   b. Picking a T-thing and drag and drop the L-thing on a desired location on the map.

22. The system of claim 16 wherein the meta-LT-thing is created by the user picking more than one LT-thing and assembling them into a meta-LT-thing.

23. The system of claim 14 wherein the platforms of a P-Thing can be treated by the user as operands of logical operations.

24. The system of claim 1 wherein the user can import target platforms of other users into a portal conditioned upon the user's permission being granted.

25. The system of claim 1 wherein the user can grant access to other users to customize the temporal and spatial behavior aspects of desired things with respect to one or more of the user's target platforms.

26. The system of claim 1 wherein each platform contains user information that accumulates over time including configuration parameters.

27. The system of claim 26 further including a portal that provides the drag-and-drop graphical user interface, the system further including an agent keeping track of the user information on all platforms and ensures that user information is archived on the portal, such that the user information could be reinstated to the new platform the user introduces to the portal.

28. The system of claim 27 further including a translation engine deployed to provide reinstatement of user information on a replacement or new platform introduced by the user.

29. A method for customizing temporal and spatial behavior aspects of a plurality of desired things with respect to one or more target platforms on a computer graphical user interface, the steps including:
   a) selecting a first thing from among a plurality of things in a things cache;
   b) dragging the first selected thing to a calendar to create a first time-driven thing (T-thing) such that the first time-driven thing will be associated with a date on the calendar at which the first time-driven thing will be executed;

c) selecting a second thing from among the plurality of things in the things cache; and d) dragging the second selected thing to a map to create a second location-driven thing (L-thing) such that the second location-driven thing will be associated with a location on the map at which the second location-driven thing will be executed.

30. The method of claim 29 further including the step of dragging the T-thing to the map on the graphical user interface to create a location-time driven thing (L-T thing).

31. The method of claim 29 further including the step of dragging a third thing from among the plurality of things to a platform on the graphical user interface to create a platform-driven thing (P-thing).

* * * * *

UNITED STATES PATENT AND TRADEMARK OFFICE
CERTIFICATE OF CORRECTION

PATENT NO. : 10,664,123 B2
APPLICATION NO. : 16/273605
DATED : May 26, 2020
INVENTOR(S) : Otman A. Basir It is certified that error appears in the above-identified patent and that said Letters Patent is hereby corrected as shown below:

In the Claims

In Claim 7, Column 9, Line 21; replace "claim 1" with --claim 6--

In Claim 8, Column 9, Line 30; replace "claim 1" with --claim 6--

In Claim 9, Column 9, Line 34-35; replace "the one or more platforms" with --the at least one target platform--

In Claim 9, Column 9, Line 35-36; replace "locations of the platforms" with --locations of the target platforms--

Signed and Sealed this
Eighth Day of March, 2022

Drew Hirshfeld
*Performing the Functions and Duties of the
Under Secretary of Commerce for Intellectual Property and
Director of the United States Patent and Trademark Office*